(12) United States Patent
Noël

(10) Patent No.: US 6,385,898 B1
(45) Date of Patent: May 14, 2002

(54) LAWN EDGING WITH TRANSVERSAL SHAPE RESILIENCE

(76) Inventor: Reggie E. Noël, 103 Echo Dr., Moncton, New Brunswick (CA), E1C 3J1

(*) Notice: Subject to any disclaimer, the term of this patent is extended or adjusted under 35 U.S.C. 154(b) by 0 days.

(21) Appl. No.: 09/626,067

(22) Filed: Jul. 26, 2000

(30) Foreign Application Priority Data

Aug. 13, 1999 (CA) .............................................. 2280212

(51) Int. Cl.$^7$ ................................................ A01G 1/08
(52) U.S. Cl. ................................... 47/33; 47/23; 47/24
(58) Field of Search ............................... 47/33, 23, 24; 404/7

(56) References Cited

U.S. PATENT DOCUMENTS

| 3,485,449 A | 12/1969 | Wilson ........................ 239/201 |
| 3,788,001 A | 1/1974 | Balfanz ........................... 47/33 |
| 3,803,760 A | 4/1974 | Matvey ........................... 47/33 |
| 4,321,769 A | * 3/1982 | Tisbo et al. ..................... 47/33 |
| 4,381,622 A | 5/1983 | Spidell .......................... 47/33 |
| 4,690,382 A | 9/1987 | Koperdak ....................... 256/1 |
| 4,809,459 A | 3/1989 | Bryua et al. .................... 47/33 |
| 4,897,973 A | 2/1990 | Foster, Jr. et al. ............. 52/102 |
| 5,456,045 A | 10/1995 | Bradley et al. ................. 47/33 |
| 5,544,445 A | 8/1996 | Mantilla ......................... 47/33 |
| 5,857,288 A | 1/1999 | Wiste ............................. 47/33 |

FOREIGN PATENT DOCUMENTS

| CA | 2137719 | 6/1995 |
| CA | 2146494 | 12/1995 |
| DE | 2837126 | 2/1980 |
| DE | 3039971 | 5/1982 |

* cited by examiner

*Primary Examiner*—Peter M. Poon
*Assistant Examiner*—Floris C Copier
(74) *Attorney, Agent, or Firm*—Mario Theriault

(57) ABSTRACT

The present invention is a lawn edging made of plastic material and comprising a ridge extending along a length thereof. A soil covering portion extends from and along the ridge. A soil penetrating portion also extends from and along the ridge at an angle from the soil covering portion. The soil penetrating portion has an anchoring projection along an edge thereof. A lip extends from and along the ridge, along a median of the angle mentioned above, away from the soil covering portion and the soil penetrating portion. The angle mentioned above is less than a right angle such that when the soil covering portion is bent at a right angle with the soil penetrating portion, the lip extends away from a plane defined by the soil penetrating portion. The lawn edging is also collapsible and bendable to form a coil having parallel coil layers.

7 Claims, 2 Drawing Sheets

LAWN EDGING WITH TRANSVERSAL SHAPE RESILIENCE

FIELD OF THE INVENTION

The present invention relates to lawn edgings having a L-shaped cross-section comprising a soil covering portion and a soil penetrating portion, and more particularly, the present invention relates to lawn edgings that have transversal shape resilience in use, and that are packaged and sold in a compact coiled form.

BACKGROUND OF THE INVENTION

The prior art comprises two common types of lawn edgings. The first type has a flat soil covering strip to cover a soil surface which is not accessible to a lawn mower, such as along building foundations and fences for examples. The soil covering strip deprives the soil from rain and sunlight and prevents the growth of grass and other vegetation at that location. These lawn edgings are installed to obviate the need to use a weed trimmer for trimming the grass along the structures bordering a lawn. Examples of lawn edgings of the first type are described in the following documents:

U.S. Pat. No. 3,485,449 issued on Dec. 23, 1969 to J. L. Wilson;

U.S. Pat. No. 3,803,760 issued on Apr. 16, 1974 to J. J. Matvey;

U.S. Pat. No. 4,381,622 issued on May 3, 1983 to V. B. Spidell;

U.S. Pat. No. 4,690,382 issued on Sep. 1, 1987 to E. A. Koperdak;

U.S. Pat. No. 4,809,459 issued on Mar. 7, 1989 to A. Brylla et al.;

U.S. Pat. No. 4,897,973 issued on Feb. 6, 1990 to W. A. Foster, Jr. et al.;

U.S. Pat. No. 5,544,445 issued on Aug. 13, 1996 to J. A. Mantilla;

U.S. Pat. No. 5,857,288 issued on Jan. 12, 1999 to W. V. Wiste.

Lawn edgings of the second type have a narrow fence-like configuration, a portion of which is inserted in the ground. These lawn edgings are used as landscape dividers around flower beds, walkways, rock gardens, and to retain mulch around trees. Lawn edgings of the second type are illustrated and described in the following documents:

U.S. Pat. No. 3,788,001 issued on Jan. 29, 1974 to G. F. Balfanz, Jr.;

U.S. Pat. No. 5,456,045 issued on Oct. 10, 1995 to D. R. Bradley et al.;

CA Appl. 2,137,719 published on Jun. 14, 1995 by C. A. Torp, Jr. et al.; CA Appl. 2,146,494 published on Dec. 2, 1995 by D. J. Reum et al;

DT Patent No. 3,039,971 published on May 27, 1982 by B. Grueber.

The lawn edgings that are of particular interest herein consist of a combination of the two common types, having a L-shaped cross-section comprising a soil covering portion and a soil penetrating portion. Lawn edgings of that type are normally made with semi-rigid plastic material and are sold in straight lengths with connectors. L-shaped lawn edgings are preferred for use along foundation walls, for their ease of installation basically and for their ability to remain close to the wall. However, straight lengths of lawn edging are known to be inconvenient to stack in a display rack, and to carry from a hardware store to a customer's residence. They are also difficult to install around curbs, walkways and other curved landscape features.

In the past, the packaging of a lawn edging in a compact roll form has been limited to the narrow type edgings where each turn in a roll is relatively thin. It is believed that there is no L-shaped lawn edging in the prior art which can be marketed in coils and deployed by a customer to form a malleable, durable and well anchored soil cover. As such, it is believed that there continues to be a need for a L-shaped lawn edging which has all the advantages of the straight length edgings, but which can be packaged in a compact coiled form.

SUMMARY OF THE INVENTION

The present invention provides for a lawn edging that has a L-shaped cross-section and that is collapsible and bendable to form an even-layered coil. The coiled edging takes minimum floor space in a retail store and is easily handled by customers. The lawn edging of the present invention is easily deployed into a resilient structure which is easy to install and which maintains a good appearance. The lawn edging of the present invention resists buckling and lifting and maintains a positive seal against the foundation wall along which it is installed.

Broadly, in a first aspect of the present invention, there is provided a lawn edging made of plastic material and comprising: a ridge extending along a length thereof; a soil covering portion extending from and along the ridge; a soil penetrating portion also extending from and along the ridge at an angle from the soil covering portion, and a lip extending from and along the ridge, away from the soil covering portion and the soil penetrating portion. The lip extends along a median of the angle mentioned above. The angle mentioned above is less than a right angle such that when the soil covering portion is bent at right angle with the soil penetrating portion, the lip extends away from a plane defined by the soil penetrating portion.

The major advantage of this feature is that the tip of the lip maintains a good seal against the foundation wall. The irregularities present on a foundation wall behind the soil penetrating portion do not prevent the tip of the lip to follow and conform to the surface of that wall for sealing the foundation wall against rain and blowing dust and weed seeds which may otherwise promote the growth of vegetation along the wall.

In accordance with another feature of the present invention, the soil covering portion and the soil penetrating portion have a same nominal thickness. The lawn edging further has a first transition region between the ridge and the soil covering portion, and a second transition region between the ridge and the soil penetrating portion. The first and second transition regions have a thickness variation from the nominal thickness at a distance from the ridge to about three times the nominal thickness near the ridge. The distance covered by each thickness variation is about five times the nominal thickness. These thickness variations are advantageous for providing substantial resilience between the ridge and the soil penetrating portion and the soil covering portion, for urging the soil covering portion against the soil surface when the lawn edging is installed.

In yet another aspect of the present invention there is provided a lawn edging in a collapsed mode. The lawn edging is made of plastic material and comprises: a ridge extending therealong; a soil covering portion extending from and along the ridge; a soil penetrating portion extending from the ridge and along and substantially parallel to the soil covering portion, and a lip extending from the ridge, opposite the soil covering portion and the soil penetrating portion. The soil penetrating portion has an anchoring projection having substantially a same thickness as the ridge. The soil covering portion has a width substantially equivalent to a distance between the anchoring projection and the ridge. The lawn edging is thereby bendable to form a coil having parallel coil layers.

In accordance with a further feature of the present invention, there is provided a lawn edging installed along a foundation wall at the soil level along that foundation wall. The lawn edging comprises: a ridge extending along the foundation wall; a soil covering portion extending from the ridge on the soil surface along the foundation wall; a soil penetrating portion extending downward from the ridge and along the foundation wall substantially at right angle with the soil covering portion, and a lip extending from the ridge and abutting against the foundation wall. The lip makes substantially a same angle between the soil covering portion and the soil penetrating portion.

The advantages of this installation are that a contact of the lip against the foundation wall causes a void to be formed between the soil penetrating portion and the foundation wall for improving a sealing engagement of the tip of the lip against the foundation wall for preventing water, dust, seeds and pollen from entering between the foundation wall and the soil penetrating portion. Also, a soil pressure against the soil penetrating portion toward the foundation wall urges the soil covering portion against the soil surface, for preventing buckling and lifting of the soil covering portion, thereby ensuring a good appearance of the lawn edging.

Still another feature of the invention is that it is susceptible of a low cost of manufacture with regard to materials, equipment and labour, and which accordingly is then susceptible of low price of sale to the industry, thereby making such lawn edging economically available to the public.

Other advantages and novel features of the invention will become apparent from the following detailed description.

BRIEF DESCRIPTION OF THE DRAWINGS

A preferred embodiment of the present invention selected by way of examples will now be described with reference to the accompanying drawings, in which.

DETAILED DESCRIPTION OF THE PREFERRED EMBODIMENT

Figure 1:
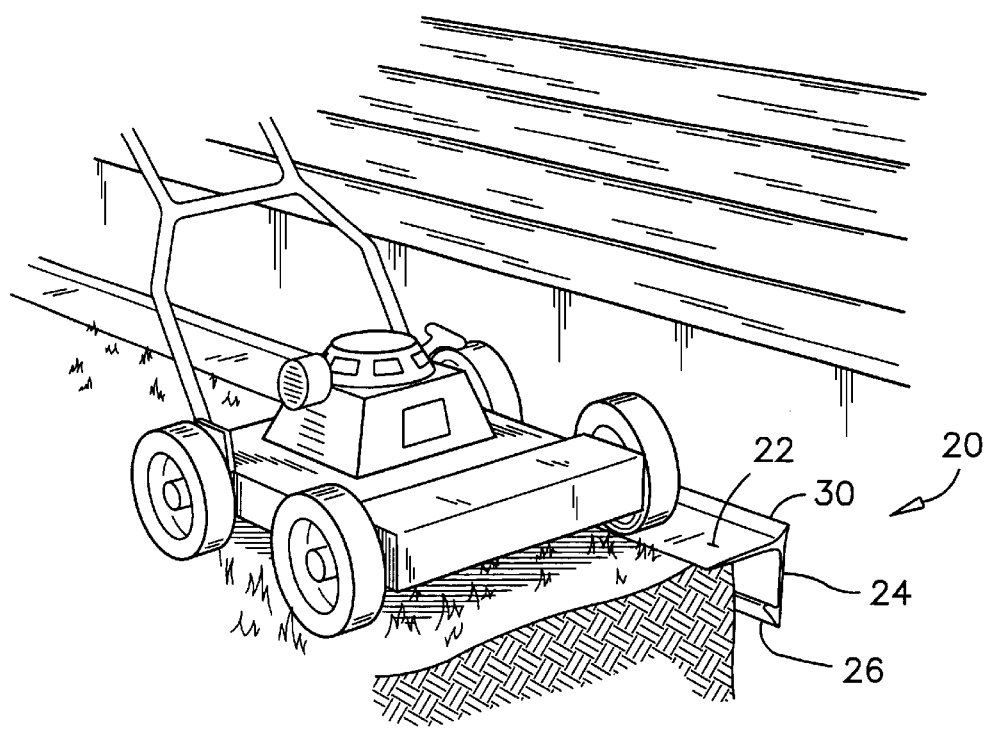
FIG. 1 illustrates the lawn edging according to the preferred embodiment in an installed mode.

While this invention is susceptible of embodiments in many different forms, there is shown in the drawings and will be described in details herein a specific embodiment, with the understanding that the present disclosure is to be considered as an example of the principles of the invention and is not intended to limit the invention to the embodiment illustrated and described.

Reference is firstly made to FIGS. 1–4 to describe the lawn edging according to the preferred embodiment and its structural features in an installed mode. The lawn edging 20 comprises a soil covering flange 22, a soil penetrating web 24, an anchoring projection 26 on the web, a ridge 28 joining the flange 22 to the web 24 and a sealing lip 30 extending from the ridge opposite the web and the flange. The lawn edging 20 is preferably made by extrusion with flexible PVC plastic material, resistant to UV radiation, to softening in warm weather and to brittleness in freezing temperatures.

Figure 3:
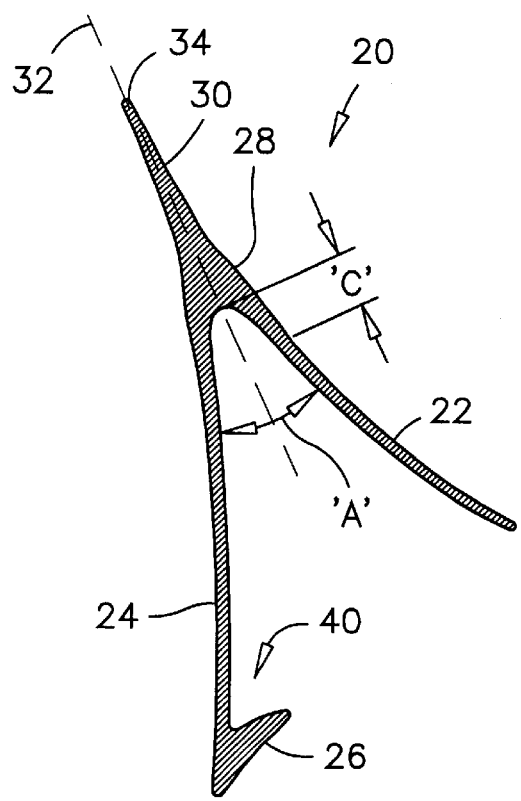
FIG. 3 illustrates a cross-section of the lawn edging as extruded.
Figure 4:
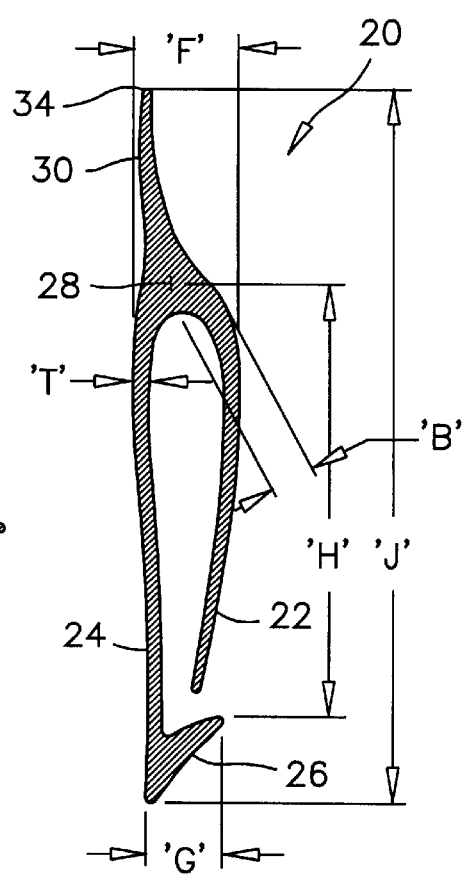
FIG. 4 illustrates a cross-section of the lawn edging in a bendable mode.

The lawn edging 20 is preferably extruded with an angle 'A' of about 30° between the web 24 and the flange 22. The lip 30 preferably extends along a median 32 of that angle opposite the web 24 and the flange 22. The lawn edging 20 is preferably extruded as illustrated in FIG. 3; flattened as illustrated in FIG. 4 when still warm, and cooled off in the flattened shape. This method of manufacturing the edging causes the edging to maintain a memory of the flattened shape and to remain resilient in its deployed L-shaped mode.

The thicknesses of the flange 22 and of the web 24 at a distance from the ridge 28 are a same thickness 'T' and gradually blend into the ridge 28. The thickness 'B' of the web 24 and flange 22 at their respective connection point with the ridge 28 is about three times the thickness 'T'. The distance 'C' over which the flange 22 and the wed 24 taper out into the ridge 28 is about five times the thickness 'T' to provide a variable stiffness to the flange 22 and to the web 24 from the ridge 28. The distance 'C' is also referred to herein as the first and second transition regions. The lip 30 tapers down gradually from the ridge 28 to the tip 34 thereof.

Figure 2:
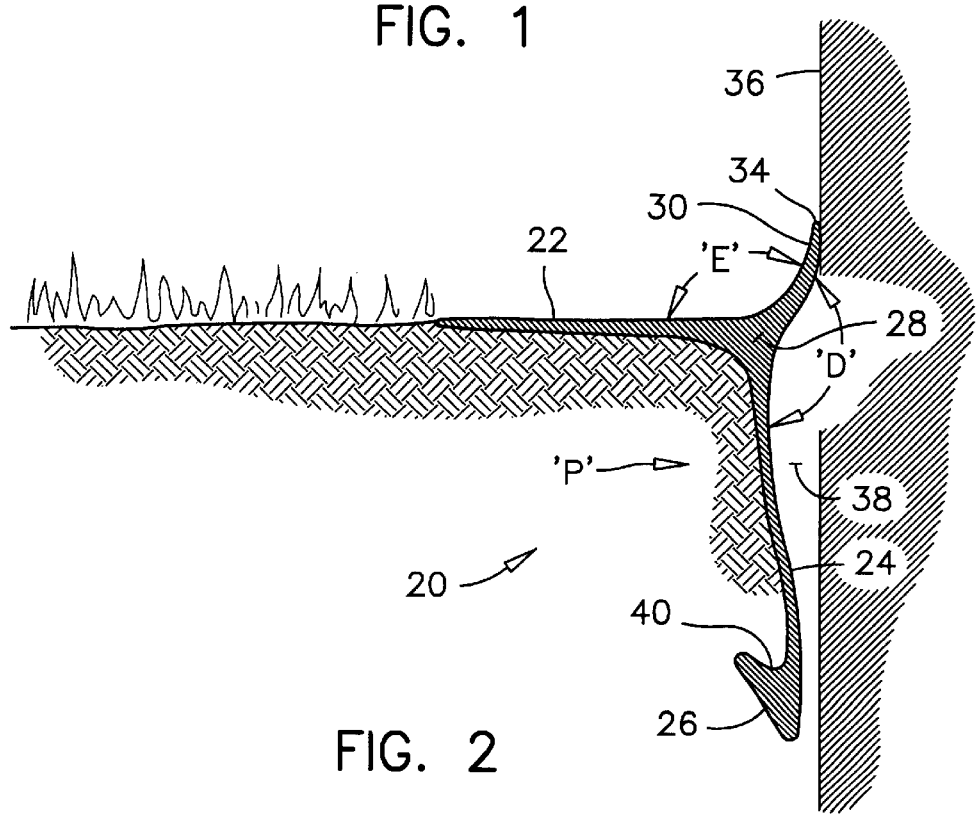
FIG. 2 is a cross-section of the lawn edging in the installed mode.

The above dimensions are advantageous for maintaining the edging 20 in proper installed position, as explained below. Referring particularly to FIG. 2, the angle 'D' between the lip 30 and the web 24 and the angle 'E' between the lip 30 and the flange 22 are about a same angle. The pressure 'P' from the soil causes the lip 30 to push against the foundation wall 36 to prevent the growth of grass and weeds along the foundation wall.

The pressure 'P' from the soil against the ridge 28 and the lip 30 also applies a torque on the ridge 28 to urge the flange 22 downward against the soil. Because of this feature, principally, the installed lawn edging 20 has a better appearance than other lawn edgings and maintains its shape in warm and cold weathers. When the edging 20 is installed along a foundation wall 36, the lip 30 extends away from a plane defined by the web 24. The stiffness of the lip 30, of the flange 22 and of the web 24 cause the ridge 28 to stay at a distance from the foundation wall 36. The void 38 shown in FIG. 2 between the ridge 28 and the foundation wall 36 is somewhat exaggerated in this drawing, but nonetheless illustrates the pressure point of the lip 30 against the foundation wall. The advantage of this feature is that surface irregularities present on the foundation wall do not overly affect the sealing of the tip 34 of the lip 30 against the foundation wall 36. Because of this void 38, the ridge 28 is not in a firm contact with the surface irregularities on the foundation wall. The stiffness of the ridge 28 does not prevent the lip 30 from following the contour of surface irregularities beneath the edging for maintaining a good seal against the wall. This longitudinal flexibility in the sealing lip 30 also contributes to maintaining a good appearance of the edging 20 in an installed mode.

The anchoring projection 26 has a groove 40 formed therein. The anchoring projection 26 is driven down along a foundation wall 36 for example by pushing with a screwdriver or similar tool having a square-ended blade into the groove 40.

Figure 5:
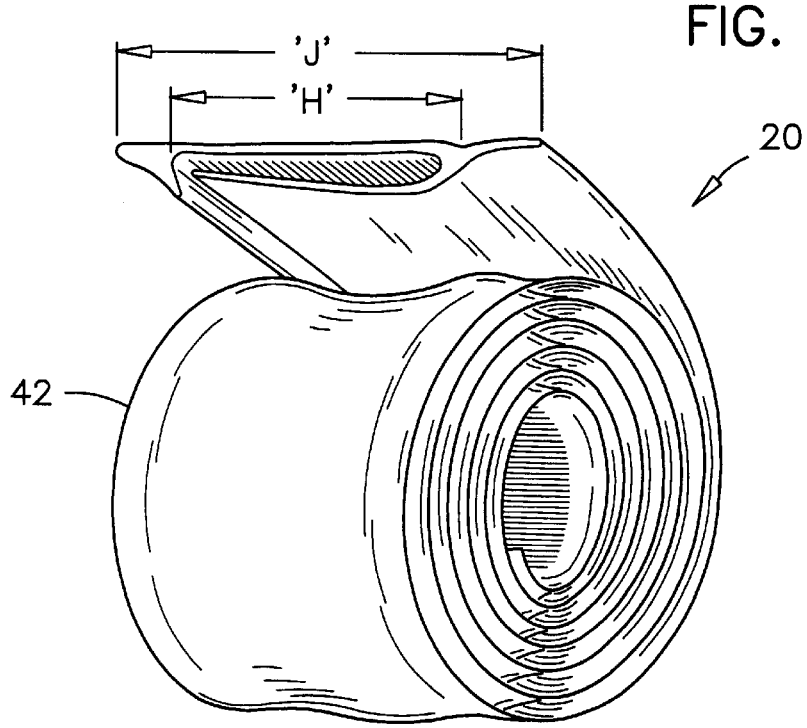
FIG. 5 illustrates the lawn edging in a coiled form.

Referring now to FIGS. 4 and 5, the features of the preferred lawn edging 20 in a coiled mode will be described.

The thickness 'F' of the ridge 28 is about the same as the thickness 'G' of the anchoring projection 26. The width 'H' of the flange 22 is about the same as the distance between the anchoring projection 26 and the ridge 28. The width 'H' of the flange 22 is more than half and preferably about ¾ of the total width 'J' of the edging 20 in a collapsed mode.

The above dimensions are advantageous for rolling the edging 20 in a compact coiled form 42 and for packaging and marketing the edging in this form. The coil 42 is relatively stable because a substantial portion of the width 'H' thereof has an even thickness. The coil 42 can be tied with a strapping around its circumference or across its layers. A typical coil 42 contains up to 30 feet (10 meters) of edging or more. When the coil 42 is tied with a strapping around its circumference, the coil can be manipulated firmly without spreading axially.

As to additional details related to the manufacturing and uses of the lawn edging according to the present invention, the same should be apparent from the above description, and accordingly further discussion relative to these matters is not provided.

While one embodiment of the present invention has been described herein above, it will be appreciated by those skilled in the art that various modifications, alternate materials, shapes and equivalents may be employed without departing from the true spirit and scope of the invention. Therefore, the above description and illustrations should not be construed as limiting the scope of the invention which is defined by the appended claims.

I claim:

1. A lawn edging installed along a foundation wall at a soil level along said foundation wall, said lawn edging comprising:

a ridge extending along said foundation wall;

a soil covering portion extending transversally from said ridge, and along said foundation wall on a soil surface along said foundation wall;

a soil penetrating portion extending transversally from said ridge and along said foundation wall substantially at right angle downward with said soil covering portion;

a lip extending transversally from said ridge and abutting against said foundation wall; said lip making substantially a same angle between said soil covering portion and said soil penetrating portion;

such that a contact of said lip against said foundation wall causes a void to be formed between said soil penetrating portion and said foundation wall for improving a sealing engagement of a tip of said lip with said foundation wall, and such that a soil pressure against said soil penetrating portion urges said soil covering portion against said soil surface.

2. The lawn edging as claimed in claim 1, wherein said soil penetrating portion comprises an anchoring projection along an edge thereof.

3. The lawn edging as claimed in claim 2, wherein said anchoring projection comprises a groove therealong.

4. The lawn edging as claimed in claim 1, wherein said soil covering portion and said soil penetrating portions have a same thickness.

5. The lawn edging as claimed in claim 4, further comprising a first transition region between said ridge and said soil covering portion, and a second transition region between said ridge and said soil penetrating portion, and said first and second transition regions having a thickness variation from said thickness at a distance from said ridge to about three times said thickness near said ridge.

6. The lawn edging as claimed in claim 5, wherein said distance is about five times said thickness.

7. The lawn edging as claimed in claim 6, wherein said lip tapers down transversally gradually from said ridge.

* * * * *